(12) United States Patent
Fujii et al.

(10) Patent No.: US 8,068,506 B2
(45) Date of Patent: Nov. 29, 2011

(54) SIGNALING APPARATUS AND SIGNALING METHOD

(75) Inventors: Yasuki Fujii, Kawasaki (JP); Shinya Kano, Kawasaki (JP); Kouichirou Amemiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 12/560,551

(22) Filed: Sep. 16, 2009

(65) Prior Publication Data

US 2010/0008262 A1      Jan. 14, 2010

Related U.S. Application Data

(63) Continuation of application No. PCT/JP2007/058108, filed on Apr. 12, 2007.

(51) Int. Cl.
*H04L 12/46* (2006.01)

(52) U.S. Cl. ......... 370/401; 370/420; 370/463; 409/249

(58) Field of Classification Search .................. None
See application file for complete search history.

(56) References Cited

U.S. PATENT DOCUMENTS

| | | | |
|---|---|---|---|
| 6,683,874 B1 | 1/2004 | Nagami et al. | |
| 2002/0023152 A1 | 2/2002 | Oguchi | |
| 2005/0117592 A1 | 6/2005 | Nagami et al. | |
| 2006/0083251 A1 | 4/2006 | Kataoka et al. | |
| 2007/0047465 A1 | 3/2007 | Kano | |
| 2008/0095176 A1* | 4/2008 | Ong et al. | 370/400 |
| 2008/0170857 A1* | 7/2008 | Bardalai | 398/59 |
| 2010/0138527 A1* | 6/2010 | Liu | 709/223 |

FOREIGN PATENT DOCUMENTS

| | | |
|---|---|---|
| JP | 2000-138711 | 5/2000 |
| JP | 2001-292163 | 10/2001 |
| JP | 2002-111666 | 4/2002 |
| JP | 2004-158971 | 6/2004 |
| JP | 2006-121249 | 5/2006 |
| JP | 2006-128999 | 5/2006 |
| JP | 2007-060461 | 3/2007 |

OTHER PUBLICATIONS

International Preliminary Report on Patentability and Written Opinion of the International Searching Authority dated Oct. 13, 2009, from the corresponding International Application.

(Continued)

*Primary Examiner* — Hassan Phillips
*Assistant Examiner* — Duc Duong
(74) *Attorney, Agent, or Firm* — Katten Muchin Rosenman LLP

(57) ABSTRACT

A signaling apparatus is applied to a node constituting a network including internal network to network interface (INNI) domains having INNI interfaces between a plurality of networks in an area and external network to network interface (ENNI) domains having ENNI interfaces that connect the INNI domains. The apparatus includes a processing unit that processes a signaling message for setting a path when an end-to-end path that passes through the INNI domains and the ENNI domains that connect the INNI domains is set in response to the signaling message, a storing unit that holds information on types of links between an own node and adjacent nodes, and a judging unit that judges whether the own node is a connection end point of the INNI domains or the ENNI domains with reference to route information in the message and the information on the types of the links held in the storing unit.

10 Claims, 7 Drawing Sheets

OTHER PUBLICATIONS

International Search Report dated Jul. 17, 2007, from the corresponding International Application.

Dimitri Papadimitriou. "OSPFv2 Routing Protocols Extensions for ASON Routing, draft-ietf-ccamp-gmpls-ason-routing-ospf-02.txt", Network Working Group, Internet Draft, Oct. 2006.

R. Braden, et al. " Resource ReSerVation Protocol (RSVP)—Version 1 Functional Specification", Network Working Group, Request for Comments: 2205, Sep. 1997.

D. Awduche, et al. "RSVP-TE: Extensions to RSVP for LSP Tunnels", Network Working Group, Request for Comments: 3209, Dec. 2001.

L. Berger. "Generalized Multi-Protocol Label Switching (GMPLS) Signaling Functional Description" Network Working Group, Request for Comments: 3471, Jan. 2003.

L. Berger. "Generalized Multi-Protocol Label Switching (GMPLS) Signaling Resource ReserVation Protocol-Traffic Engineering (RSVP-TE) Extensions" Network Working Group, Request for Comments: 3473, Jan. 2003.

Mike Soulakis, et al. "Draft OIF E-NNI Signaling Specification (OIF E-NNI 2.0)" Optical Internetworking Forum, Oct. 19, 2006.

* cited by examiner

FIG. 2

| OWN NODE ID | ADJACENT NODE ID | ASSOCIATED AREA |
|---|---|---|
| A | B | AREA2 |
| B | A | AREA2 |
| B | C | AREA2 |
| C | B | AREA2 |
| A | D | |
| D | A | |
| C | E | |
| E | C | |

*FIG. 5*

4 LINK TYPE TABLE IN NODE A

| ADJACENT NODE ID | LINK TYPE |
|---|---|
| D | ENNI |
| B | INNI |

FIG. 6

| OWN NODE ID | ADJACENT NODE ID |
|---|---|
| A | B |
| B | A |
| B | C |
| C | B |
| A | D |
| D | A |
| C | E |
| E | C |

SIGNALING APPARATUS AND SIGNALING METHOD

CROSS-REFERENCE TO RELATED APPLICATION

This is a continuation of application PCT/JP2007/058108, filed on Apr. 12, 2007, now pending, the contents of which are herein wholly incorporated by reference.

FIELD

The disclosures made herein relate to a signaling apparatus and a signaling method, which are applied to a node constituting a network including internal network to network interface (INNI) domains having INNI interfaces (INNIs) between a plurality of networks in an area, and external network to network interface (ENNI) domains having ENNI interfaces (ENNIs) that connect the INNI domains.

In particular, the disclosures made herein relate to a signaling apparatus and a signaling method, which enable a load imposed on a boundary node (start-point node) of the INNI domains in searching for an end-point node of an INNI connection to be reduced when a path that passes through the INNI domains configured for respective carriers or vendors and the ENNI domains that connect the INNI domains is set in response to a signaling message.

BACKGROUND

Conventionally, for example, in a network configuration illustrated in FIG. 1, nodes D, A, B, C, and E use a routing protocol (see RFC2328 and RFC3630) such as Open Shortest Path First-Traffic Engineering (OSPF-TE) to advertise link information containing associated area information "areas 1, 2, and 3," and construct topology information (see FIG. 2) of an entire network.

When an instruction to set a path is received, the start-point node D of the path computes a route from a start point to an end point, and transfers a signaling message (Path message) containing route information "A, B, C, E" using a signaling protocol (see RFC2205, RFC3209, RFC3471, and RFC3473) such as Resource Reservation Protocol-Traffic Engineering (RSVP-TE). The signaling message further contains end-to-end end-point node information and connection end-point node information.

An end-to-end path from the start-point node D to the end-point node E is divided into connections for each of external network to network interface (ENNI) domains and internal network to network interface (INNI) domains. The start-point node A of an INNI connection sequentially searches, based on route information "B, C, E" in the signaling message and the topology information held, through the nodes on the route to check if any one of which is an area boundary, finds the end-point node C of the INNI connection, stores "C" as the connection end-point node information in the signaling message, and transfers the signaling message to the next node B.

Upon receiving the signaling message, the next node B judges if the connection end-point node information "C" is an own node (a local node). When the local node is the end-point node C, the node B performs a connection end-point processing, and further transfers the signaling message to the node E next thereto.

In this conventional technology, there is a need for the start-point node A of the INNI connection to sequentially search, based on the route information "A, B, C, E" in the signaling message and the topology information held, for the end-point node C of the INNI connection.

The start-point node A of the INNI connection sequentially searches, based on the route information "B, C, E" in the signaling message, the topology information illustrated in FIG. 2 to check with which area each of the A-B link, the B-C link, and the C-E link is associated, judges the node C to be the area boundary, and sets the node C as the end-point node of the connection.

However, with this approach, as a number of hops in the INNI connection increases (2 hops in the example of FIG. 1), the processing load in judging the end point of the INNI connection inevitably increases in proportion thereto.

The following are related arts to the invention.

[Patent document 1] Japanese Patent Laid-Open Publication No. JP 2006-121249

[Non-patent document 1] RFC2328, RFC3630; draft-ietf-ccamp-gmpls-ason-routing-ospf-02.txt, OIF2005.313.08, etc.

[Non-patent document 2] RFC2205, RFC3209, RFC3471, RFC3473;

OIF2005.381.09-Draft OIF E-NNI Signaling Specification (OIF E-NNI 2.0), etc.

SUMMARY

According to an aspect of the disclosures made herein, a signaling apparatus is applied to a node constituting a network including internal network to network interface (INNI) domains having INNI interfaces between a plurality of networks in an area and external network to network interface (ENNI) domains having ENNI interfaces that connect the INNI domains. The signaling apparatus includes a processing unit that processes a signaling message for setting a path when an end-to-end path that passes through the INNI domains and the ENNI domains that connect the INNI domains is set in response to the signaling message, a storing unit that holds information on types of links between an own node and adjacent nodes, and a judging unit that judges whether the own node is a connection end point of the INNI domains or the ENNI domains with reference to route information in the signaling message and the information on the types of the links held in the storing unit.

In this structure, the judging unit judges that the own node is an end point of an INNI connection when the type of the link between the own node and a previous node is the INNI interface and the type of the link between the own node and a next node is the ENNI interface, and the processing unit performs an end-point processing of the INNI connection and a start-point processing of an ENNI connection.

Further, the judging unit judges that the own node is a relay node of the INNI connection when the type of the link between the own node and the previous node is the INNI interface and the type of the link between the own node and the next node is the INNI interface, and the processing unit performs a relay processing of the INNI connection.

Further, the judging unit judges that the own node is an end point of the ENNI connection when the type of the link between the own node and the previous node is the ENNI interface and the type of the link between the own node and the next node is the INNI interface, and the processing unit performs an end-point processing of the ENNI connection and a start-point processing of the INNI connection.

Further, when the judging unit judges that the own node is a start point of the INNI connection, the processing unit sets, in connection end-point node information in the signaling message, the same information as end-point node information of the end-to-end path in the signaling message.

The objects and advantages of the invention will be realized and attained by means of the elements and combinations particularly pointed out in the claims.

BRIEF DESCRIPTION OF THE DRAWINGS

FIG. 2 is a diagram for describing topology information in the conventional network;

FIG. 5 is a diagram for describing a link type table according to the embodiment of the invention;

FIG. 6 is a diagram for describing topology information according to the embodiment of the invention.

DESCRIPTION OF EMBODIMENTS

Figure 1:
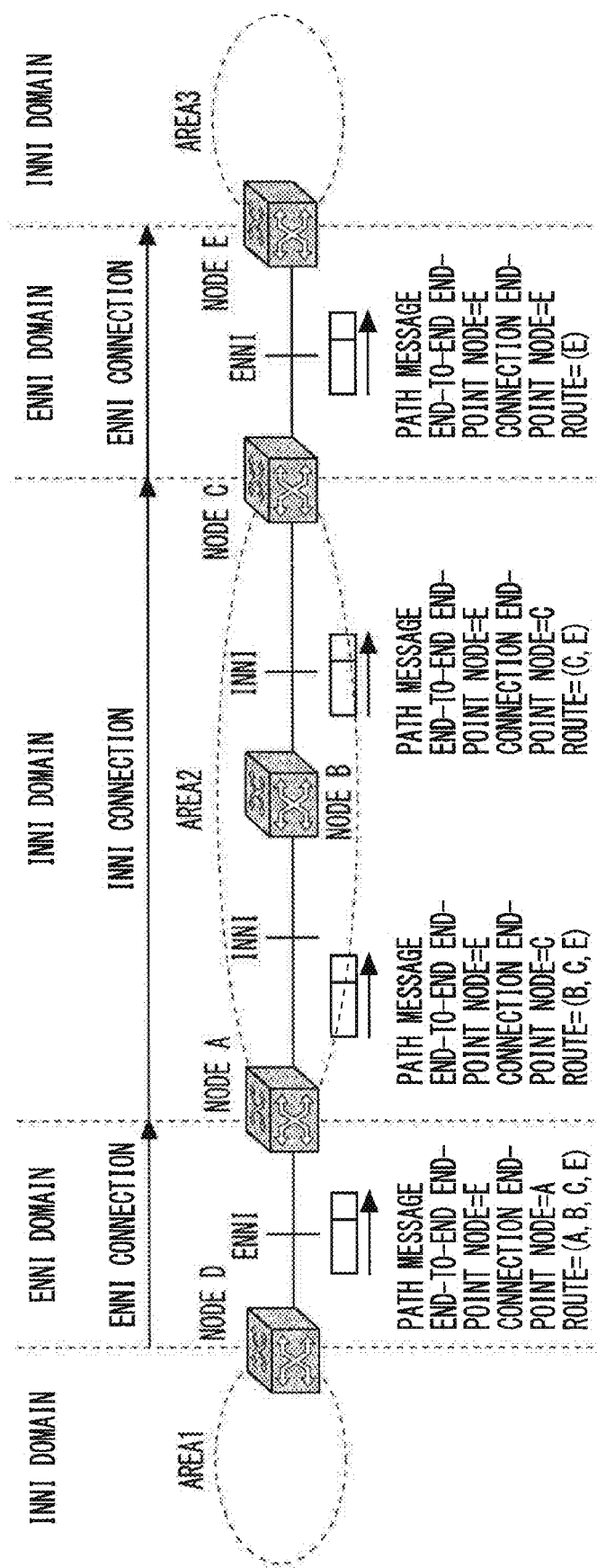
FIG. 1 is a diagram for describing a conventional network.

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

Configuration of Signaling Apparatus

Figure 3:
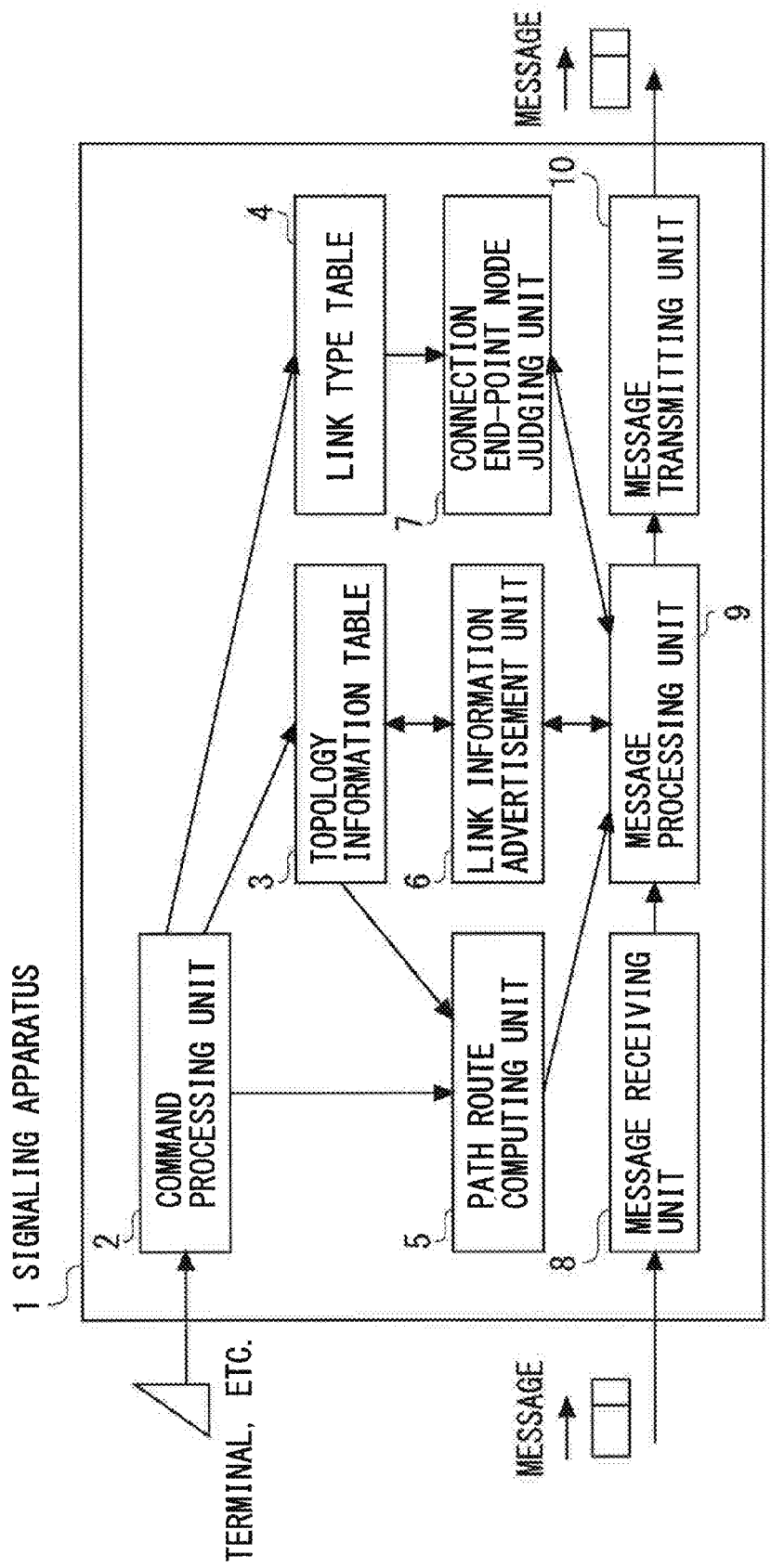
FIG. 3 is a block diagram illustrating a configuration of a signaling apparatus according to one embodiment of the invention.
Figure 4:
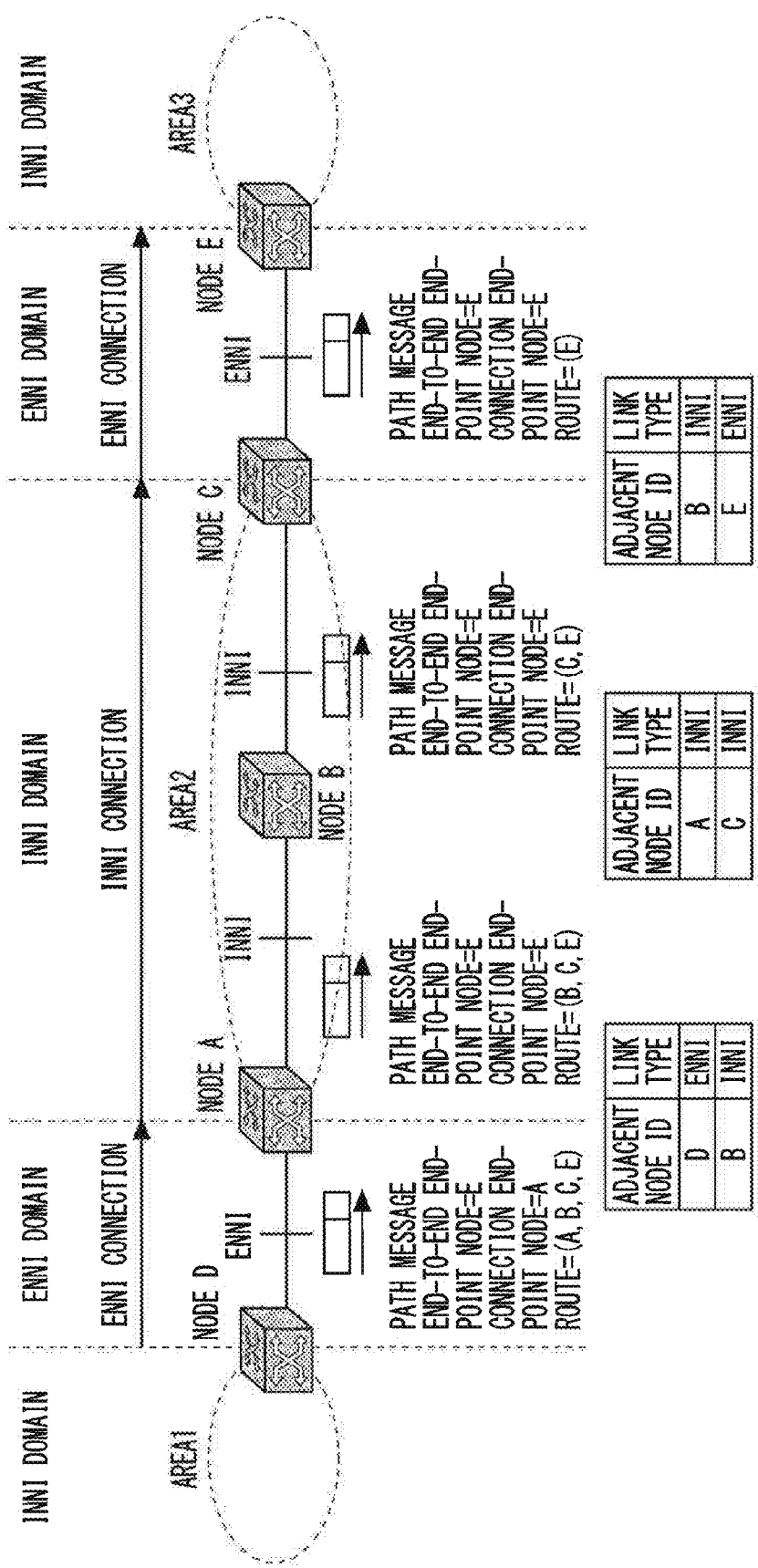
FIG. 4 is a diagram for describing a network according to the embodiment of the invention.

Referring to FIG. 3 illustrating a configuration of a signaling apparatus according to one embodiment of the present invention, the signaling apparatus 1 is applied to each of nodes A to E constituting a network illustrated in FIG. 4.

The signaling apparatus 1 includes a command processing unit 2, a topology information table 3, a link type table 4, a path route computing unit 5, a link information advertisement unit 6, a connection end-point node judging unit 7, a message receiving unit 8, a message processing unit 9, and a message transmitting unit 10.

The command processing unit 2 sends, based on an instruction from a maintenance terminal such as a terminal provided for each station corresponding to a node or a terminal for centralized control via a communication line, path start-point/end-point information and the like to the path route computing unit 5, sets initial topology information in the topology information table 3, and sets necessary information in the link type table 4.

The topology information table 3 holds network topology information. In the link type table 4, types of links connected to the local node are preset by the command processing unit 2.

The path route computing unit 5 computes a path route based on the path start-point/end-point information, the topology information, and the like. The link information advertisement unit 6 receives link information from other nodes, updates the topology information, and advertises the link information to the other nodes.

The connection end-point node judging unit 7 judges whether the local node is a connection end-point node based on a received signaling message and information on the types of the links held in the link type table 4. The message receiving unit 8 receives the signaling message from an adjacent node. The message processing unit 9 performs processings such as generating, transferring, and terminating of the signaling message. The message transmitting unit 10 transmits the signaling message to another adjacent node.

Operation Example

Next, an operation example of the signaling apparatus 1 according to the embodiment of the present invention illustrated in FIG. 3 is described.

FIG. 4 illustrates a configuration of the network (network system) to which the signaling apparatus 1 is applied. The network includes internal network to network interface (INNI) domains having INNI interfaces (INNIs) between a plurality of networks in the same area, and external network to network interface (ENNI) domains having ENNI interfaces (ENNIs) that connect the INNI domains.

The signaling apparatus 1 applied to each of the nodes A to E constituting the network enables a load imposed on a boundary node (start-point node) of the INNI domains in searching for an end-point node of the INNI connection to be reduced when a path that passes through the INNI domains configured for respective carriers or vendors and the ENNI domains that connect the INNI domains is set in response to the signaling message.

The signaling apparatus 1 of each of the nodes A to E holds the link type table 4 in which the types of the links between the local node and the adjacent nodes are preset.

FIG. 5 is an example of the link type table 4 in the signaling apparatus 1 of the node A, which is the start-point node of the INNI connection. The signaling apparatus 1 of each of the nodes A to E also holds the topology information of the entire network as illustrated in FIG. 6.

In this network, consider a case where an end-to-end path from the node D to the node E is set.

First, in the signaling apparatus 1 of the start-point node D of the path, the path route computing unit 5 computes a route to the node E. Here, the route is node D-node A-node B-node C-node E.

Then, the signaling apparatus 1 (message transmitting unit 10) of the node D transmits the signaling message for setting the path (Path (path setting) message in Resource Reservation Protocol-Traffic Engineering (RSVP-TE)) to the node A, which is the next node on the route. The message contains end-to-end end-point node information "E", connection end-point node information "A", and route information "A, B, C, E."

Upon reception of the message, the signaling apparatus 1 (connection end-point node judging unit 7, message receiving unit 8, and message processing unit 9) of the node A judges that the local node is an end point of the ENNI connection to perform an end-point node processing of the ENNI connection from the type of the link between the node A and the previous node D being "ENNI", and also that the local node is a start point of the INNI connection to start setting of the INNI connection.

The signaling apparatus 1 (message processing unit 9) of the node A sets, in the connection end-point node information in a newly-generated path setting message, the same information as the end-to-end end-point node information, that is, "E". The signaling apparatus 1 (message processing unit 9 and message transmitting unit 10) of the node A also transmits a message obtained by removing the local node from the route information to the next node B.

Figure 7:
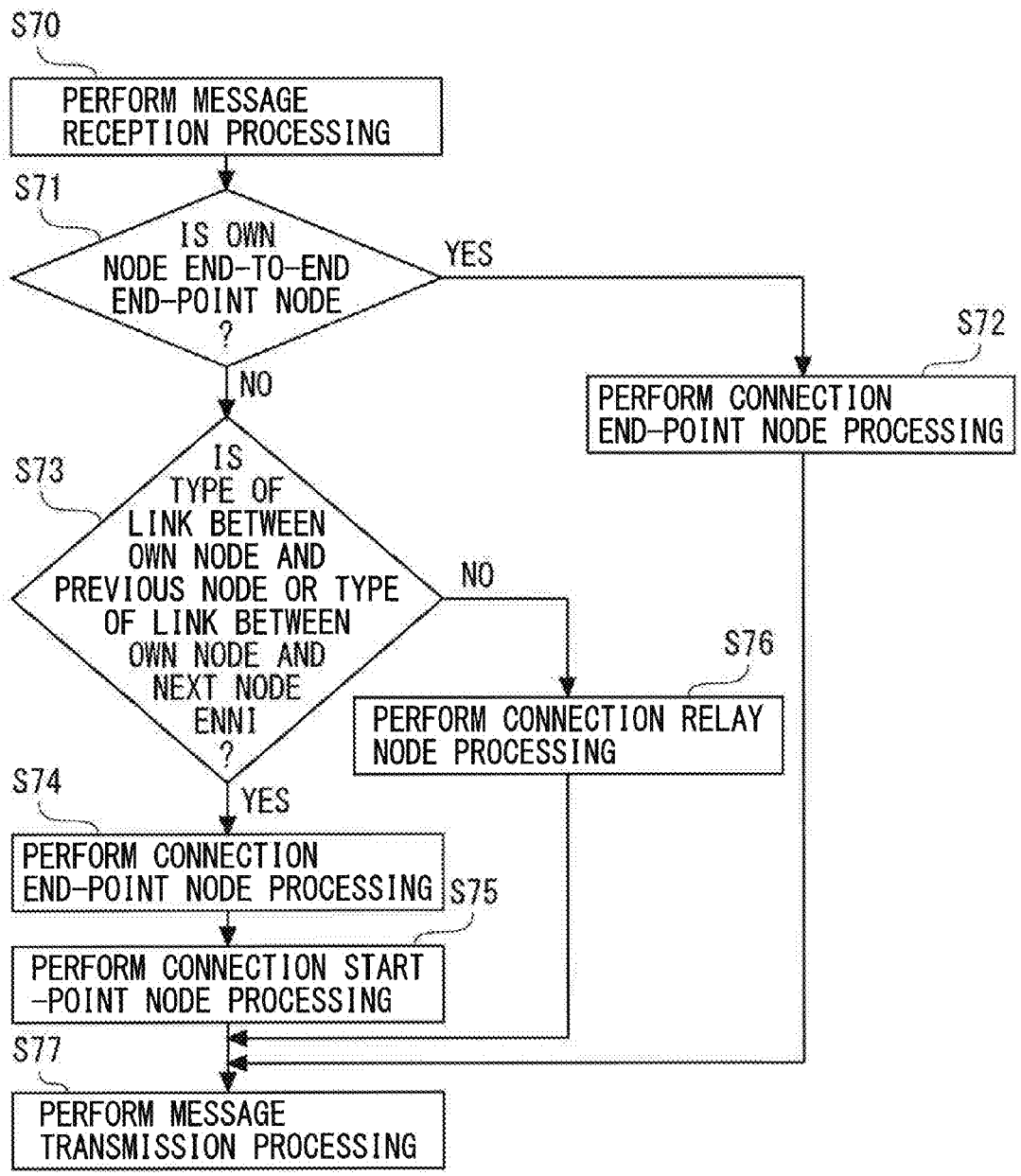
FIG. 7 is a diagram for describing a connection end-point node judgment in the signaling apparatus according to the embodiment of the invention.

The connection end-point node judging unit 7 of the signaling apparatus 1 of each of the nodes in the INNI domains judges whether the local node is the connection end point following procedures (S70 to S77) of a flow chart illustrated in FIG. 7.

(1) The connection end-point node judging unit 7 judges that the local node is the end point of the INNI connection when the type of the link between the local node and the previous node is "INNI" and the type of the link between the local node and the next node is "ENNI", and the message processing unit 9 performs an end-point processing (end-point node processing) of the INNI connection and a start-point processing (start-point node processing) of the ENNI connection.

(2) The connection end-point node judging unit 7 judges that the local node is a relay node of the INNI connection when the type of the link between the local node and the previous node is "INNI" and the type of the link between the local node and the next node is "INNI", and the message processing unit 9 performs a relay processing (relay node processing) of the INNI connection.

(3) The connection end-point node judging unit 7 judges that the local node is the end point of the ENNI connection when the type of the link between the local node and the previous node is "ENNI" and the type of the link between the local node and the next node is "INNI", and the message processing unit 9 performs an end-point processing of the ENNI connection and a start-point processing of the INNI connection.

(4) The connection end-point node judging unit 7 judges that the local node is the end point of the ENNI connection when the type of the link between the local node and the previous node is "ENNI" and the type of the link between the local node and the next node is "ENNI", and the message processing unit 9 performs the end-point processing of the ENNI connection and the start-point processing of the ENNI connection.

Specifically, upon receiving the signaling message from the node A, the signaling apparatus 1 of the node B refers to the link type table 4 and judges that the local node is the relay node of the connection because the type of the link between the node B and the node A, which is the previous node, is "INNI" and the type of the link between the node B and the node C, which is the next node, is "INNI". Therefore, the message processing unit 9 removes the local node from the route information in the message to transfer the message to the next node C.

Upon receiving the message, the signaling apparatus 1 of the node C refers to the link type table 4, judges that the local node is the end point of the INNI connection because the type of the link between the node C and the previous node B is "INNI" and the type of the link between the node C and the node E, which is the next node, is "ENNI", and performs a connection end-point node processing.

Under RSVP-TE, the signaling apparatus 1 of the node C returns a Resv message to the node B in the connection end-point node processing. The signaling apparatus 1 of the node C, which is also the start-point node of the ENNI connection, newly generates a path setting message and transmits the same to the next node E in the connection start-point node processing.

Effects

According to the disclosed signaling apparatus, the connection end-point node search processing in the start-point node of the INNI domains, which is the area boundary node, is decreased to thereby decrease the processing load.

Modified Examples

The processings described above in the embodiment may be provided as a program that is executable by a computer, and may be provided in a recording medium such as a compact disk-read only memory (CD-ROM) or a flexible disk, or via a communication line.

Further, the processings in the embodiment described above may be implemented in combination by selecting any plurality or all of the processings.

What is claimed is:

1. A signaling apparatus applied to a node constituting a network including internal network to network interface (INNI) domains having INNI interfaces between a plurality of networks in an area and external network to network interface (ENNI) domains having ENNI interfaces that connect the INNI domains, comprising:
   a processing unit that processes a signaling message for setting a path when an end-to-end path that passes through the INNI domains and the ENNI domains that connect the INNI domains is set in response to the signaling message;
   a storing unit that holds information on types of links between an own node and adjacent nodes; and
   a judging unit that judges whether the own node is a connection end point of the INNI domains or the ENNI domains with reference to route information in the signaling message and the information on the types of the links held in the storing unit.

2. The signaling apparatus according to claim 1, wherein:
   the judging unit judges that the own node is an end point of an INNI connection when the type of the link between the own node and a previous node is the INNI interface and the type of the link between the own node and a next node is the ENNI interface; and
   the processing unit performs an end-point processing of the INNI connection and a start-point processing of an ENNI connection.

3. The signaling apparatus according to claim 1, wherein:
   the judging unit judges that the own node is a relay node of an INNI connection when the type of the link between the own node and a previous node is the INNI interface and the type of the link between the own node and a next node is the INNI interface; and
   the processing unit performs a relay processing of the INNI connection.

4. The signaling apparatus according to claim 1, wherein:
   the judging unit judges that the own node is an end point of an ENNI connection when the type of the link between the own node and a previous node is the ENNI interface and the type of the link between the own node and a next node is the INNI interface; and
   the processing unit performs an end-point processing of the ENNI connection and a start-point processing of an INNI connection.

5. The signaling apparatus according to claim 1, wherein, when the judging unit judges that the own node is a start point of an INNI connection, the processing unit sets, in connection end-point node information in the signaling message, the same information as end-point node information of the end-to-end path in the signaling message.

6. A signaling method executed in a node constituting a network including internal network to network interface (INNI) domains having INNI interfaces between a plurality of networks in an area and external network to network interface (ENNI) domains having ENNI interfaces that connect the INNI domains, comprising:

processing a signaling message for setting a path when an end-to-end path that passes through the INNI domains and the ENNI domains that connect the INNI domains is set in response to the signaling message;

holding information on types of links between an own node and adjacent nodes; and judging whether the own node is a connection end point of the INNI domains or the ENNI domains with reference to route information in the signaling message and the information on the types of the links held in a storing unit.

7. The signaling method according to claim 6, wherein:

the judging judges that the own node is an end point of an INNI connection when the type of the link between the own node and a previous node is the INNI interface and the type of the link between the own node and a next node is the ENNI interface; and the processing performs an end-point processing of the INNI connection and a start-point processing of an ENNI connection.

8. The signaling method according to claim 6, wherein:

the judging judges that the own node is a relay node of an INNI connection when the type of the link between the own node and a previous node is the INNI interface and the type of the link between the own node and a next node is the INNI interface; and the processing performs a relay processing of the INNI connection.

9. The signaling method according to claim 6, wherein:

the judging judges that the own node is an end point of an ENNI connection when the type of the link between the own node and a previous node is the ENNI interface and the type of the link between the own node and a next node is the INNI interface; and the processing performs an end-point processing of the ENNI connection and a start-point processing of an INNI connection.

10. The signaling method according to claim 6, wherein, when the judging judges that the own node is a start point of an INNI connection, the processing sets, in connection end-point node information in the signaling message, the same information as end-point node information of the end-to-end path in the signaling message.

* * * * *